June 23, 1953 L. E. WINN 2,642,992
FLOUR SIFTER
Filed July 13, 1948 5 Sheets-Sheet 2
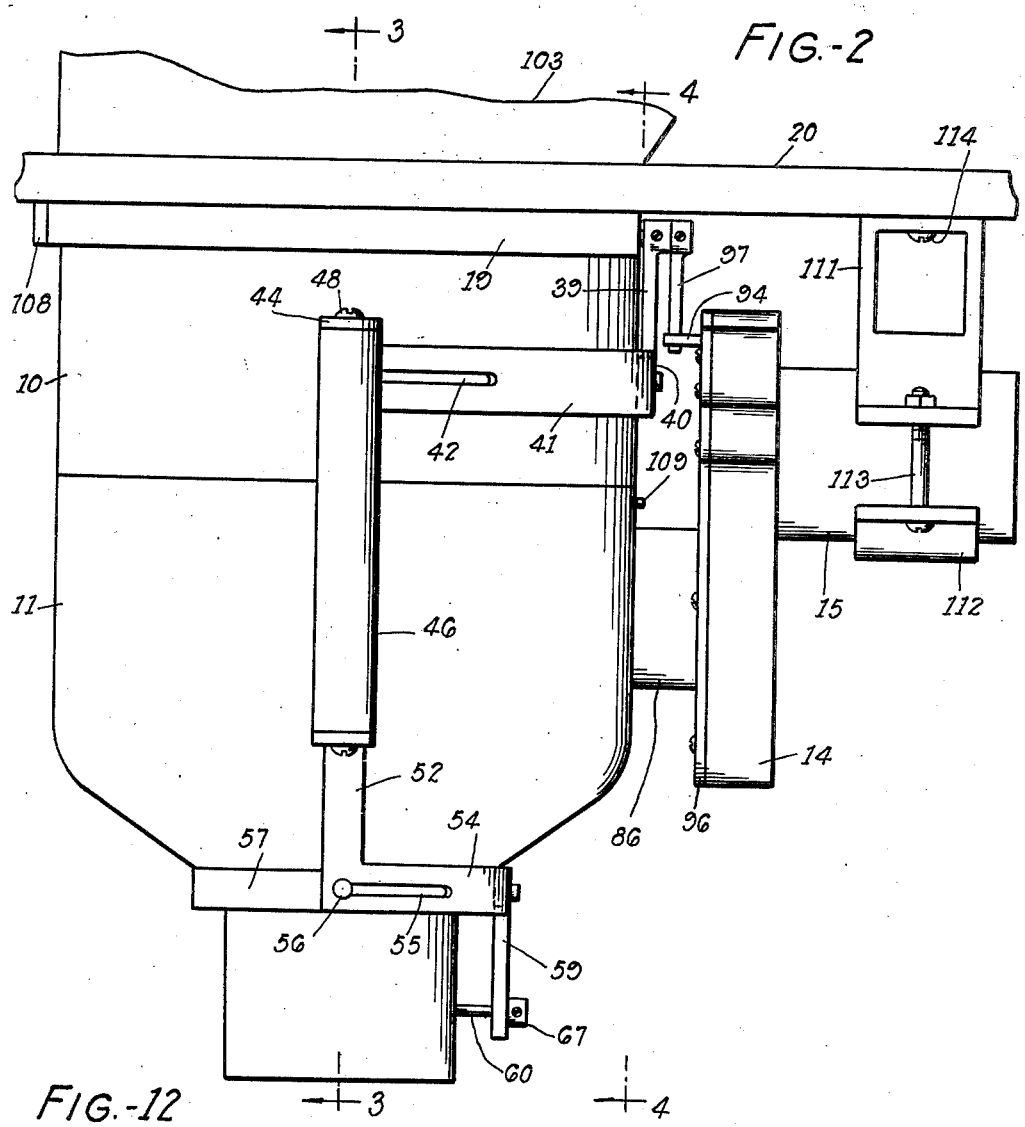
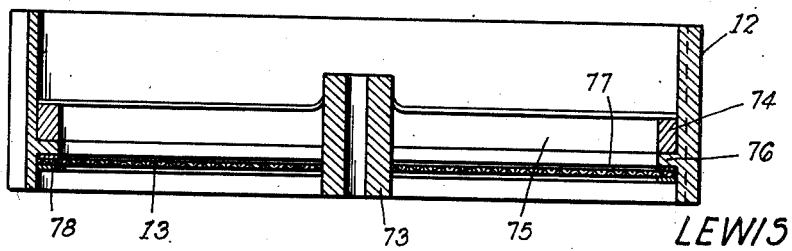
INVENTOR.
LEWIS E. WINN
BY Victor J. Evans & Co.
ATTORNEYS June 23, 1953     L. E. WINN     2,642,992
FLOUR SIFTER
Filed July 13, 1948        5 Sheets-Sheet 3
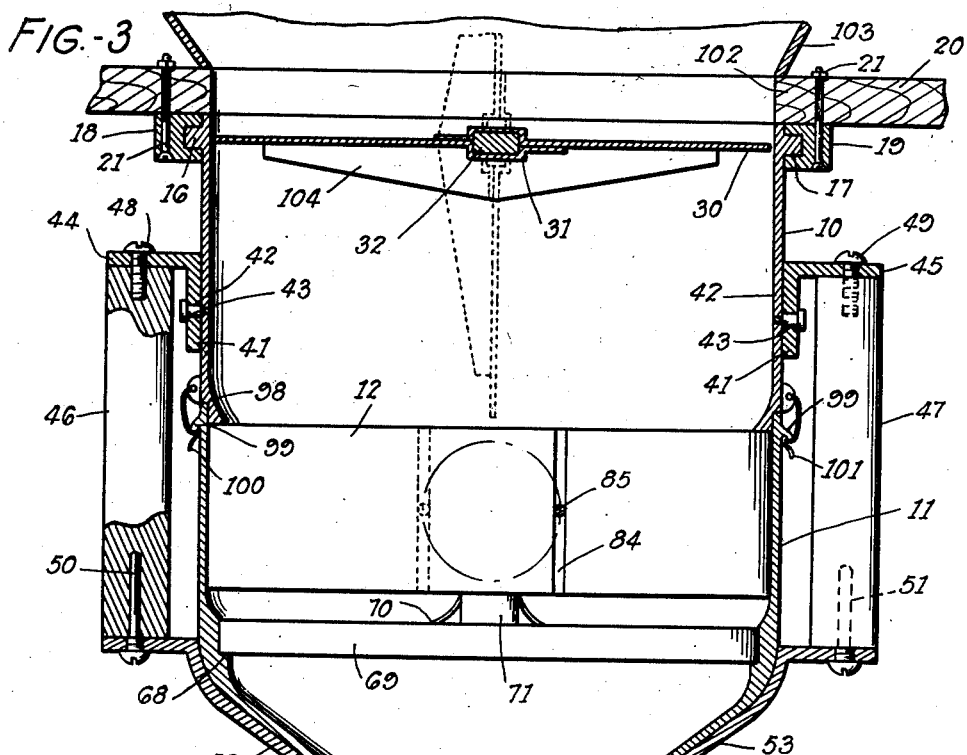
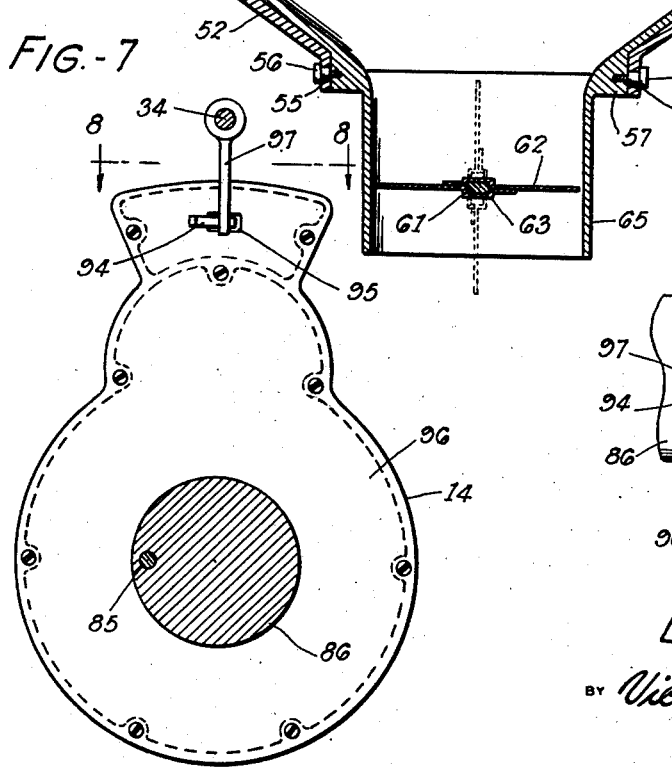
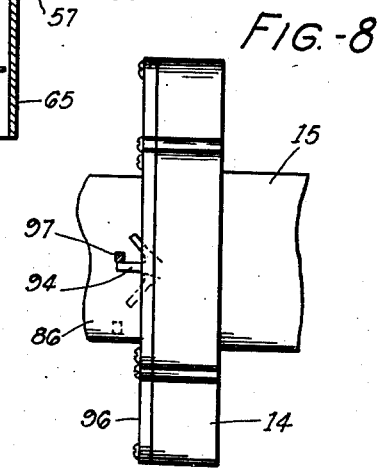
INVENTOR.
LEWIS E. WINN
BY Victor J. Evans & Co.
ATTORNEYS June 23, 1953  L. E. WINN  2,642,992
FLOUR SIFTER Filed July 13, 1948  5 Sheets-Sheet 4

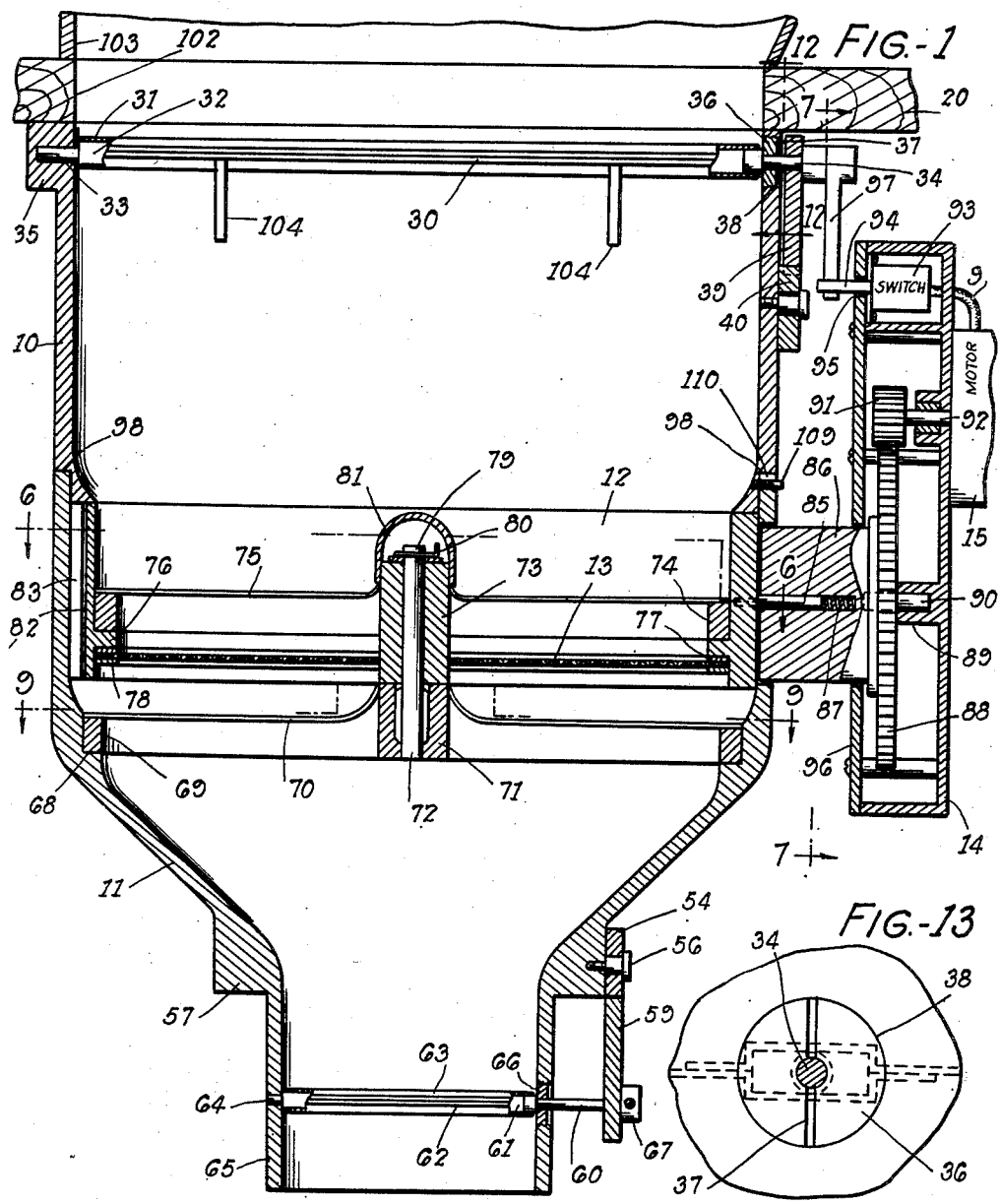

INVENTOR.
LEWIS E. WINN
BY *Victor J. Evans & Co.*
ATTORNEYS

June 23, 1953
L. E. WINN
2,642,992
FLOUR SIFTER
Filed July 13, 1948
5 Sheets-Sheet 5
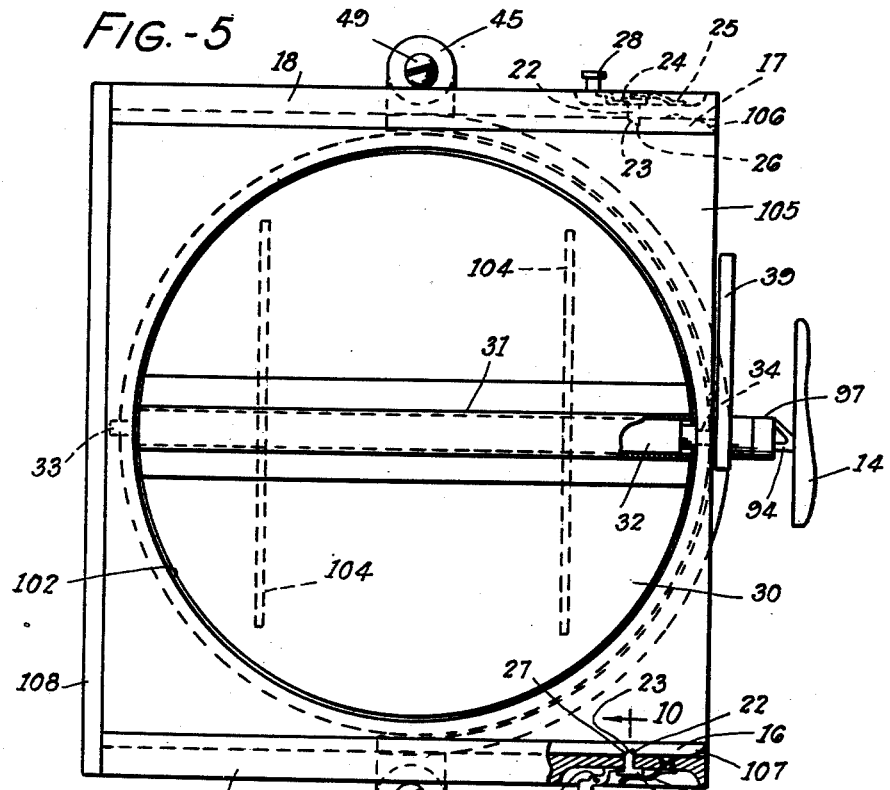
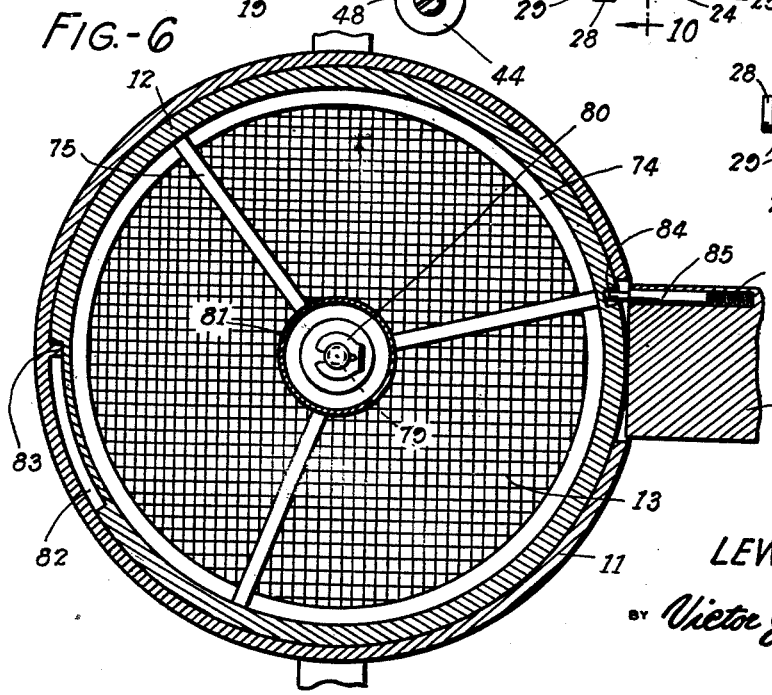
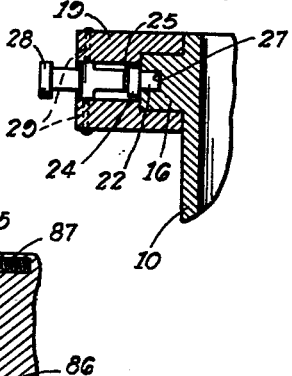
INVENTOR.
LEWIS E. WINN
BY Victor J. Evans & Co.
ATTORNEYS Patented June 23, 1953

2,642,992

UNITED STATES PATENT OFFICE 2,642,992

FLOUR SIFTER

Lewis E. Winn, Leaksville, N. C.

Application July 13, 1948, Serial No. 38,426

3 Claims. (Cl. 209—240)

This invention relates to portable power actuated dispensers and sifters for flour and the like for domestic use, and in particular a comparatively small casing formed in two parts with a horizontally disposed screen freely mounted in a lower part, butterfly valves above and below the screen and a motor at one side for oscillating the screen through an eccentric.

The purpose of this invention is to provide a small unique device for dispensing flour and the like that may be mounted on the under surface of a shelf in a kitchen by which selected amounts of flour may be deposited in containers and in which the operator has absolute control over the operation thereof.

Various types of motor and manually actuated flour sifters and dispensers have been provided and some of these include measuring means, but it has been found desirable to provide a complete sifter and dispenser with the parts embodied in a simple housing and in which the actuating elements may be positively controlled. With this thought in mind this invention contemplates a vertically disposed cylindrical casing with an outlet or neck of reduced diameter formed on a lower section and with a screen carried by an oscillating ring actuated by an eccentric at one side driven by a motor and with handles at the sides for controlling the valves and motor.

The object of this invention is, therefore, to provide means for constructing a dispenser for flour and the like so that the operation thereof may be controlled by vertically disposed handles at the sides, and in which the amount of flour dispensed thereby may be controlled.

Another object of the invention is to provide a dispenser having an oscillating element in combination with valves in which the valves and oscillating element are controlled common handles.

Another object of the invention is to provide a combination dispenser and sifter in which the casing thereof is formed in two parts with one part removably attached to the other.

A further object of the invention is to provide a combination dispenser and sifter for flour and the like having oscillating means which is of a simple and economical construction.

With these and other objects and advantages in view the invention consists of the new and useful combination, construction, and arrangement of parts as hereinafter more fully described, set forth in the claims appended hereto, and disclosed in the accompanying drawings, forming part hereof, wherein:

Figure 1 is a view showing a vertical section through the dispenser with parts broken away and parts in elevation illustrating the relative positions of the parts.

Figure 2 is a similar view showing a side elevation of the device.

Figure 3 is a vertical section through the dispenser taken on line 3—3 of Figure 2.

Figure 5 is a plan view looking downward on the upper end of the dispenser.

Figure 6 is a sectional plan through the oscillating element, taken on line 6—6 of Figure 1.

Figure 7 is an elevational view of the gear housing taken on line 7—7 of Figure 1 with the eccentric shaft shown in section.

Figure 8 is a plan view of the housing shown in Figure 7, taken on line 8—8 thereof.

Figure 10 is a section taken on line 10—10 of Figure 5 illustrating one of the latches for securing the dispenser in the mounting rails, with part broken away.

Figure 11 is an elevational view of the latch shown in Figure 10 with part broken away.

Figure 12 is a vertical section through the oscillating element with the other parts omitted.

Figure 13 is a detail taken on line 12—12 of Figure 1 showing the mounting bushing which provides means for removing the shaft of the upper butterfly valve.

Figure 4:
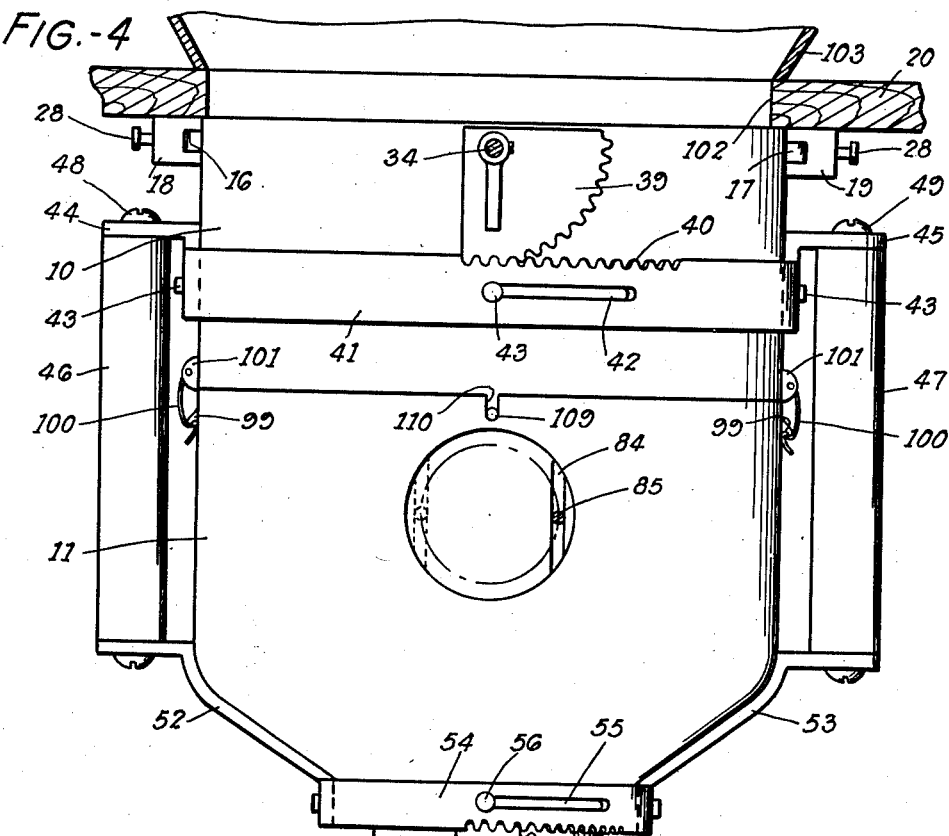
Figure 4 is an elevational view taken on line 4—4 of Figure 2 with the motor and gear housing omitted.
Figure 9:
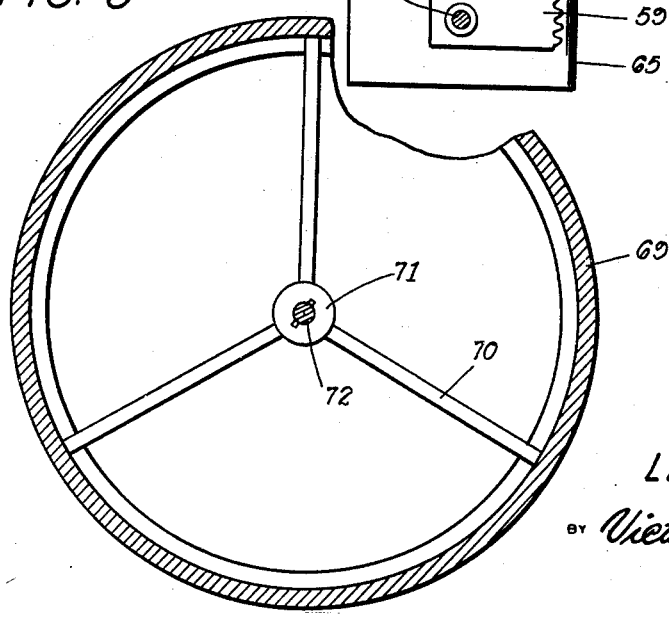
Figure 9 is a sectional plan taken on line 9—9 of Figure 1 showing the spider for mounting the oscillating element and screen in the lower section of the casing, with part broken away.

Referring now to the drawings wherein like reference characters denote corresponding parts the improved flour dispenser of this invention includes a casing having an upper section 10, a lower section 11, an oscillating ring 12, a screen 13, a gear housing 14, and a motor 15.

The upper end of the upper section 10 of the casing is provided with tongues 16 and 17 that are slidably mounted in rails 18 and 19, and the rails are secured to the under surface of a panel or shelf 20 by screws 21, as shown in Figure 3. The rails are provided with latches formed with pins 22 having beveled inner ends 23 and heads 24 by which they are held inward by springs 25 so that the inner beveled ends snap into recesses 26 and 27 in the tongues 16 and 17, respectively. The latches are provided with buttons 28 which are pivotally mounted on pins 29 as shown in Figure 5, and the buttons are provided with projecting ends that extend under the heads 24 of the pins wherein by pressing on the buttons the pins are withdrawn to release the tongues and upper section.

A butterfly valve 30 is provided in the upper end of the upper section 10 and this is provided with a tubular hub 31 by which it is freely mounted on a rectangular-shaped shaft 32 that has pins 33 and 34 at the ends. The pin 33 is journaled in a bearing 35 at one side of the casing and the pin 34 is held in a threaded bushing 36 that is provided with a screw driver slot 37 and which is larger in diameter than the width of the shaft so that with the bushing removed the shaft may be withdrawn through the opening 38 into which the bushing is screwed.

A gear segment 39 is mounted on the pin 34 which meshes with a rack 40 on the upper edge of an arcuate bar 41 which is slidably mounted through slots 42 therein on pins 43, as shown in Figures 2 and 4, around one side of the section 10. The ends of the bar 41 are provided with outwardly extending tabs 44 and 45 to which the upper ends of handles 46 and 47 are attached by screws 48 and 49, respectively.

The lower ends of the handles 46 and 47 are freely held on pins 50 and 51 at the ends of arms 52 and 53 which extend upward from a band 54 that is slidably mounted through slots 55 and screws 56 on a boss 57 of the lower section 11 of the casing, and the lower edge of the band 54 is provided with a gear rack 58 that meshes with a gear segment 59 on a pin 60 extending from one end of a rectangular-shaped shaft 61 of the lower butterfly valve 62. The shaft 61 is freely held in a hub 63 of the valve and the opposite end of the shaft is provided with a pin 64 by which it is rotatably mounted in a neck 65 at the lower end of the lower section 11 of the casing. The pin 60 is rotatably mounted in a bushing 66, similar to the bushing 36, so that the shaft 61 may readily be removed, and the segment 59 is held on the end of the shaft by a set collar 67.

It will be noted that as the handles 46 and 47 are moved around the casing the bands 41 and 54 will open and close the butterfly valves through the gear segments.

The lower section 11 of the casing is also provided with an annular seat 68 in which a ring 69 of a spider is mounted and the spider is formed with arms 70 that suspend a hub 71 which carries a spindle 72. The oscillating ring 12 is freely mounted on the spindle 72 through a hub 73 of an inner ring 74 which supports the hub through arms 75, and the hub extends downwardly through a screen 13 which is mounted below an inner annular rib 76 by supporting elements 77 and 78. The upper end of the spindle is provided with a groove 79 in which a split washer 80 is snapped to hold the ring 12 in position and the end of the hub may be covered by a cap 81.

The peripheral surface of the oscillating ring 12 is provided with an elongated slot 82 into which a projection 83 of the casing 11 extends and an actuating slot 84 into which the end of a pin 85 which is eccentrically positioned in a shaft 86 extends, as shown in Figure 6. The pin 85 is resiliently held outwardly by a spring 87 and the shaft 86 is carried by a gear 88 in the gear housing 14 in which it is mounted in a bearing 89 through a shaft 90. The gear 88 meshes with a pinion 91 on a motor shaft 92, and in the upper part of the housing 14 is a switch 93 which is provided with an arm 94 that extends through a slot 95 in a cover 96 of the housing. The arm 94 extends into the path of a lever 97 on the pin 34 and as the handles move the gear racks and segments the lever engages the arm and thereby turns on the switch which, being connected to the motor by a cable 9 starts the motor so that the oscillating ring is actuated through the gears and eccentric.

The lower end of the upper section 10 of the casing is provided with an annular recess 98 in which the upper edge of the lower section 11 is positioned, and the lower section is provided with lugs 99 over which spring clips 100 in ears 101 are snapped to support the lower section from the upper section, as shown in Figure 3. The shelf 20 is provided with an opening 102 that registers with the upper end of the casing and a spout 103 may be provided above the opening to guide flour into the dispenser. The upper valve 30 may be formed with two plates as shown in Figure 3, and the plates may be reinforced by ribs 104.

The upper section 10 may be formed with a rectangular-shaped section 105 on the edges of which the tongues 16 and 17 are positioned and the tongues may be provided with rounded ends 106 and 107, respectively. The outer end of the section 105 is provided with a gripping bar 108 to facilitate inserting and removing the dispenser from the supporting rails.

The motor is positioned midway between the rails in a plane through the center of the dispenser and as the dispenser is removed and replaced the eccentric and lever 97 are adapted to separate and come back into operative positions. The upper section 10 is provided with a locating pin 109 that registers with a slot 110 in the lower section to hold the lower part aligned with the upper part, and the motor is permanently positioned in relation to the rails, being clamped to a bracket 111 by a cap 112 with screws 113, as shown in Figure 2, and the bracket is secured to the shelf 20 by screws 114.

With the parts arranged in this manner flour or the like may be placed in the spout above the dispenser and with one hand on each handle, or with only one hand on a handle the handles may be turned to open the valves through the gear racks and segments and as the valves are opened flour will drop into and through the casing. The movement of the handles in opening the valves also closes the switch and starts the motor which turns the eccentric and oscillates the screen to sift the flour as it passes through the casing. The lower section of the casing may readily be removed by opening the snap fasteners, so that the dispenser may be cleaned.

It will be understood that modifications may be made in the design and arrangement of the parts without departing from the spirit of the invention.

What is claimed is:

1. In a dispenser for flour and the like, the combination, which comprises, a vertically disposed casing having an upper and a lower section, means removably attaching the lower section to the upper section, said upper section having tongues on the sides thereof, rails having screws for receiving the tongues of the upper section providing means for removably mounting the upper section on the under surface of a horizontally disposed panel, said lower section having a lower end of reduced size in cross section, a butterfly valve spaced from the upper end of the upper section, a butterfly valve in the reduced area of the lower section, shafts on which the valves are mounted, gear segments on the ends of the shafts positioned on the outside of the casing, arcuate bands having gear teeth in the edges providing racks slidably mounted on the casing and meshing with the said gear segments, vertically disposed handles connecting the ends of the bands for actuating the valves, a horizontally disposed screen rotatably mounted in the casing and positioned midway between the ends thereof and located between the said valves, a motor, an eccentric connection between the motor and screen for oscillating the screen, a switch connected to the motor, an arm extended from said switch and a lever extended from one of the valve actuating bands for engaging the arm of the switch to start the motor to oscillate the screen.

2. In a flour dispenser, the combination which comprises a vertically disposed casing including upper and lower sections, means removably suspending the lower section of the casing from the upper section, an upper valve pivotally mounted in the upper section of the casing, a lower valve pivotally mounted in the lower section of the casing, a ring positioned to oscillate in a horizontal plane pivotally mounted in the upper section of the casing, a horizontally disposed screen carried by the said ring and extended across the casing, said screen and ring positioned between the said valves, arcuate bars having gear teeth in the edges thereof slidably mounted on the outer surfaces of the said casing section, gear segments on the screen mounting means positioned to mesh with the said gear teeth of the bars for oscillating the said screen, said handles connecting ends of the said arcuate bars providing means for actuating the bars, segments, and valves, a motor positioned at one side of the casing, a motor circuit having a switch therein and said switch also positioned on the side of the casing, an arm carried by the pivotal mounting means of one of the valves positioned to engage the said switch for opening and closing the circuit to the motor, and means oscillating the said screen and band in which the screen is mounted by the motor.

3. In a flour dispenser, the combination which comprises a vertically disposed casing including upper and lower sections, means removably suspending the lower section of the casing from the upper section, an upper valve pivotally mounted in the upper section of the casing, a lower valve pivotally mounted in the lower section of the casing, a ring positioned to oscillate in a horizontal plane pivotally mounted in the upper section of the casing, a horizontally disposed screen carried by the said ring and extended across the casing, said screen and ring positioned between the said valves, arcuate bars having gear teeth in the edges thereof slidably mounted on the outer surfaces of the said casing section, gear segments on the screen mounting means positioned to mesh with the said gear teeth of the bars for oscillating the said screen, said handles connecting ends of the said arcuate bars providing means for actuating the bars, segments, and valves, a motor positioned at one side of the casing, a motor circuit having a switch therein and said switch also positioned on the side of the casing, an arm carried by the pivotal mounting means of one of the valves positioned to engage the said switch for opening and closing the circuit to the motor, a shaft having a pin extended from the end thereof journalled on one side of the upper section of the casing and means rotating the shaft by the motor, said ring in which the screen is mounted having a vertically disposed slot therein and said pin extended from the shaft positioned to extend into the said slot for oscillating the said ring and screen.

LEWIS E. WINN.

References Cited in the file of this patent

UNITED STATES PATENTS

| Number | Name | Date |
|---|---|---|
| 214,305 | Morrison | Apr. 15, 1879 |
| 345,823 | Amon et al. | July 20, 1886 |
| 547,510 | Wolff | Oct. 8, 1895 |
| 586,106 | Ogden | July 13, 1897 |
| 874,109 | McLoney et al. | Dec. 17, 1907 |
| 970,336 | Hough | Sept. 13, 1910 |
| 1,310,543 | Racy | July 22, 1919 |
| 1,336,538 | Rozenske | Apr. 13, 1920 |
| 2,074,162 | Bowman | Mar. 16, 1937 |
| 2,141,310 | Meeker | Dec. 27, 1938 |
| 2,204,920 | Bailey | June 18, 1940 |

FOREIGN PATENTS

| Number | Country | Date |
|---|---|---|
| 260,151 | Germany | May 21, 1913 |